United States Patent
Lobo et al.

(10) Patent No.: US 9,699,020 B1
(45) Date of Patent: Jul. 4, 2017

(54) COMPONENT AWARE MAINTENANCE ALARM MONITORING SYSTEM AND METHODS

(71) Applicant: Sprint Communications Company L.P., Overland Park, KS (US)

(72) Inventors: Shane A. Lobo, Ponte Vedra, FL (US); Brian D. Lushear, Winter Springs, FL (US); P. A. Shinholster, Jr., Orlando, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 21 days.

(21) Appl. No.: 14/946,747

(22) Filed: Nov. 19, 2015

(51) Int. Cl.
- *H04W 24/00* (2009.01)
- *H04L 12/24* (2006.01)
- *H04W 24/04* (2009.01)

(52) U.S. Cl.
CPC ...... *H04L 41/0622* (2013.01); *H04L 41/0609* (2013.01); *H04W 24/04* (2013.01)

(58) Field of Classification Search
CPC . H04W 24/02; H04L 41/0622; H04L 41/0609
USPC ........................................................ 455/424
See application file for complete search history.

(56) References Cited

U.S. PATENT DOCUMENTS

| | | | | |
|---|---|---|---|---|
| 6,363,421 B2* | 3/2002 | Barker | ............... | H04L 41/0213 709/202 |
| 7,389,345 B1* | 6/2008 | Adams | ............... | H04L 41/0622 709/223 |
| 7,711,811 B1* | 5/2010 | Adams | ............... | G06F 15/173 709/223 |
| 8,359,009 B2* | 1/2013 | Schroeder | ............... | G06F 21/86 455/404.1 |
| 2006/0073822 A1* | 4/2006 | Orton | ............... | H04L 41/0627 455/423 |
| 2010/0205289 A1* | 8/2010 | Miyazaki | ............... | H04J 3/14 709/223 |
| 2010/0304715 A1* | 12/2010 | Schroeder | ............... | G06F 21/86 455/411 |
| 2015/0379864 A1* | 12/2015 | Janchookiat | ............... | H04L 41/0631 340/511 |
| 2016/0098018 A1* | 4/2016 | Van Camp | ............... | G05B 23/0272 700/80 |

(Continued)

Primary Examiner — William Nealon (57) ABSTRACT

A component aware maintenance alarm monitoring system for one or more cellular sites is disclosed. The system comprises an alarm database, an integrated inventory database, a maintenance activity, and a monitoring server comprising a monitoring application. The monitoring application receives alarms during a maintenance period. The maintenance period is associated with maintenance of one or more radio access network (RAN) components at a cellular site. The monitoring application evaluates the alarms based on accessing RAN component alarm information from the alarm database, RAN component inventory information from the integrated inventory database, and maintenance information from the maintenance activity database. During the maintenance period, the monitoring application selectively suppresses a subset of the alarms and takes a different action on at least one alarm not included in the subset based on the evaluation of the alarms.

14 Claims, 3 Drawing Sheets

(56) References Cited

U.S. PATENT DOCUMENTS

2016/0218911 A1* 7/2016 Wessels .............. H04L 41/0609
2016/0286409 A1* 9/2016 Kravets .................. H04L 67/12

* cited by examiner

COMPONENT AWARE MAINTENANCE ALARM MONITORING SYSTEM AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cell sites that comprise cell towers have many components suitable for wireless communication. These components comprise routers, radio heads, antennas, and other components. Cell towers may have equipment suitable for implementing one or more wireless communication protocols including a code division multiple access (CDMA) wireless communication protocol, a global system for mobile communication (GSM) wireless communication protocol, a long term evolution (LTE) wireless communication protocol, a worldwide interoperability for microwave access (WiMAX) wireless communication protocol, and another protocol. Off-site monitoring, for example by a network operations center (NOC) or network management center, may monitor cell-sites and each of the components that function at the cell-sites.

SUMMARY

In an embodiment, a component aware maintenance alarm monitoring system for one or more cellular sites is disclosed. The component aware maintenance alarm monitoring system comprises an alarm database that comprises radio access network (RAN) component alarm information, an integrated inventory database that comprises RAN component inventory information, and a maintenance activity database that comprises maintenance information. The component aware maintenance alarm monitoring system additionally comprises a monitoring server comprising a monitoring application stored in a non-transitory memory of the monitoring server, that when executed by a processor of the monitoring server, receives a plurality of alarms during a maintenance period. The maintenance period is associated with maintenance of one or more RAN components at a cellular site. The monitoring application evaluates the plurality of alarms based on accessing the RAN component alarm information associated with the plurality of alarms from the alarm database, the RAN component inventory information associated with at least one of the one or more RAN components or any other RAN components associated with the plurality of alarms from the integrated inventory database, and the maintenance information associated with the cellular site from the maintenance activity database. During the maintenance period, the monitoring application selectively suppresses a subset of the plurality of alarms and takes a different action on at least one alarm of the plurality of alarms not included in the subset based on the evaluation of the plurality of alarms.

In an embodiment, a component aware maintenance alarm monitoring method for one or more cellular sites is disclosed. The component aware maintenance alarm monitoring method comprises receiving, by a monitoring application stored in a non-transitory memory and executable by a processor, one or more alarms during a maintenance period. The maintenance period is associated with maintenance of one or more radio access network (RAN) components at a cellular site. The component aware maintenance alarm monitoring method additionally comprises evaluating, by the monitoring application, the one or more alarms based on accessing RAN component alarm information associated with the one or more alarms from an alarm database, RAN component inventory information associated with at least one of the one or more RAN components or any other RAN components associated with the one or more alarms from an integrated inventory database, and maintenance information associated with the cellular site from a maintenance activity database. The component aware maintenance alarm monitoring method further comprises during the maintenance period, selectively suppressing, by the monitoring application, at least one alarm of the one or more alarms based on the evaluation of the one or more alarms.

In an embodiment, a component aware maintenance alarm monitoring method for one or more cellular sites is disclosed. The component aware maintenance alarm monitoring method comprises receiving, by a monitoring application stored in a non-transitory memory and executable by a processor, one or more alarms during a maintenance period. The maintenance period is associated with maintenance of one or more radio access network (RAN) components at a cellular site. The component aware maintenance alarm monitoring method additionally comprises evaluating, by the monitoring application, the one or more alarms based on accessing RAN component alarm information associated with the one or more alarms from an alarm database, RAN component inventory information associated with at least one of one or more RAN components or any other RAN components associated with the one or more alarms from an integrated inventory database, and maintenance information associated with the cellular site from a maintenance activity database. The component aware maintenance alarm monitoring method further comprises during the maintenance period, transmitting, by the monitoring application, a notification to a technician at the cellular site based on the evaluation of the one or more alarms. The notification identifies one or more RAN components at the cellular site that are associated with at least one alarm of the one or more alarms.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Performing maintenance on a cell site presents challenges for telecommunications service providers. Cell towers that operate at the cell-sites have a multitude of radio access network (RAN) components for different wireless communication protocols that are implemented via the cell site. A cell site (or cell tower site) in this disclosure may describe, collectively, all of the physical components necessary to receive and transmit signals and data required to facilitate the operation of a cellular network. The terms cell site (or cell tower site) may also be used in this disclosure to describe the physical location of the equipment in terms of a geographically identifiable site. The alternative meanings of the terms "cell site" or "cell tower site" in this disclosure will be easily discernable from the context in which these terms are used. Examples of RAN components may comprise radio heads, routers, antennas, electrical power sources, radio frequency power amplifiers, environment monitors, or other components. Examples of wireless communication protocols implemented by the telecommunication service providers may comprise a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless communication protocol. Notably, in some cases, two or more of these protocols are supported at the same time at the same cell site.

Traditionally, when maintenance is being performed at a cell site, all alarms received from components at the cell site during the maintenance period are suppressed and then cleared at the end of the maintenance period. This traditional monitoring of maintenance alarms does not contemplate that an alarm that is received during the maintenance period and associated with a component not receiving maintenance may need to be addressed. For example, in a traditional maintenance alarm monitoring system, if a technician is at a cell site performing maintenance on a router and accidentally pulls a cable out next to the router during the maintenance period, any alarms associated with the cable would merely be suppressed and then cleared at the end of the maintenance period. The same issues with the traditional maintenance alarm monitoring system's alarm suppression and clearing would hold true even if the non-maintenance receiving component triggered an alarm during the maintenance period for a reason unrelated to the maintenance activity being performed at the cell site.

The traditional monitoring of maintenance alarms also does not contemplate that an alarm that is received during the maintenance period and associated with the component receiving maintenance may need to be addressed. For example, in a traditional maintenance alarm monitoring system, if a technician is at a cell site and performing work on an antenna and such work triggers an alarm associated with the antenna, that alarm would be suppressed.

Regardless of whether the alarm received during the maintenance period is related or unrelated to the maintenance activity occurring at the cell site, the suppression and clearing of such an alarm by the traditional maintenance alarm monitoring system delays the fixing of the component associated with the alarm until after the maintenance period has expired and the technician has left the cell site. This outcome can negatively impact the telecommunications service provider and consequently the telecommunications service provider's customers (e.g., causing further downtime at the cell site to perform maintenance on the component, causing further expenses related to having to invest in another "truck roll" to have another technician perform maintenance on the component, etc.).

Thus, the pending application is directed to a component aware maintenance alarm monitoring system and methods. Specifically, the pending application is directed to a monitoring application executed by a monitoring server that evaluates a plurality of alarms, which are received during a maintenance period associated with maintenance of one or more components at a cell site, based on accessing component alarm information associated with the plurality of alarms from an alarm database, component inventory information associated with at least one of the one or more components or any other components associated with the plurality of alarms from an integrated inventory database, and maintenance information associated with the cell site from a maintenance activity database. The component inventory information in the integrated inventory database may comprise dependency relationships among components at the cell site, and the dependence relationships may be determined based on one or more of functional relationships between the components, physical proximity of the components, or physical couplings of the components.

In an embodiment, in contrast to the traditional maintenance alarm monitoring system discussed above that suppresses all alarms received during a maintenance period, the monitoring application disclosed herein utilizes the correlation of the component inventory information with the alarm information and the maintenance information to selectively suppress a subset of the plurality of alarms based on the evaluation of the plurality of alarms. In an additional or alternative embodiment, in contrast to the traditional maintenance alarm monitoring system discussed above that clears all the alarms once the maintenance period has elapsed, the monitoring application disclosed herein utilizes the correlation of the component inventory information with the alarm information and the maintenance information to transmit a notification to a technician at the cell site during the maintenance period based on the evaluation of the plurality of alarms. The notification may identify one or more components at the cell site that are associated with at least one alarm of the plurality of alarms.

The equipment or components that make up a cell tower may be managed using different inventory and fault systems, which are not integrated, thereby making detailed fault monitoring difficult. The component aware maintenance alarm monitoring system and methods disclosed herein provide detailed fault monitoring on a component level, which is necessarily rooted in computer technology. In particular, the monitoring application disclosed herein receives and evaluates a plurality of alarms generated by one or more different fault systems based on correlating component inventory information (for example, from different inventory systems) with alarm information (for example, from the different fault systems) and the maintenance information (for example, from a separate maintenance tool) in order to selectively suppress alarms received during a maintenance period and/or transmit a notification to a technician at the cell site during the maintenance period.

The selective suppression of alarms received during a maintenance period and/or the transmission of a notification to a technician at the cell site during the maintenance period based on the evaluation of the alarms may reduce cell site downtime by allowing a component associated with a received alarm to be addressed during the maintenance period, and thereby increase customer satisfaction. Additionally, the selective suppression of alarms received during a maintenance period and/or the transmission of a notification to a technician at the cell site during the maintenance period based on the evaluation of the alarms received during the maintenance period may reduce maintenance costs by allowing a technician already present at the cell site performing maintenance to address the component associated with the received alarm. In particular, the component aware maintenance alarm monitoring system and methods disclosed herein enable a new fault to be detected and a notification to be sent to the technician already at the cell site so that he or she can immediately fix the new fault without the telecommunications service provider having to invest in a separate "truck roll."

Figure 1:
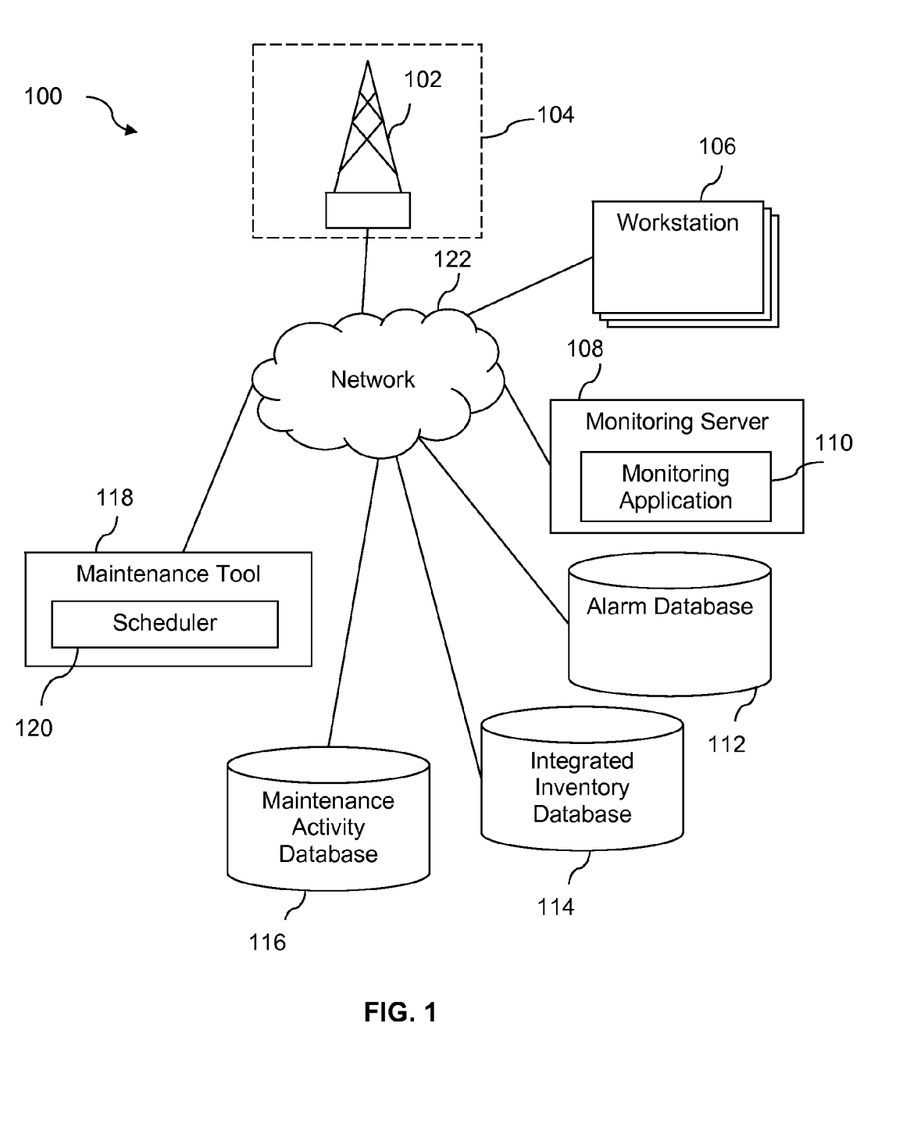
FIG. 1 is a block diagram of a system according to an embodiment of the disclosure.

Now turning to FIG. 1, a component aware maintenance alarm monitoring system 100 is disclosed. In an embodiment, the component aware maintenance alarm monitoring system 100 comprises a cell tower 102 or a base transceiver station 102 at a cell tower site (cell site) 104, one or more workstations 106, a monitoring server 108, a monitoring application 110, an alarm database 112, an integrated inventory database 114, a maintenance activity database 116, a maintenance tool 118 that comprises a scheduler 120, and a network 122.

The cell tower 102 is configured to provide a radio communication link to other electronic devices based on one or more of a CDMA wireless communication protocol, a GSM wireless communication protocol, a LTE wireless communication protocol, a WiMAX wireless communication protocol, or another cellular wireless communication protocol. The cell tower 102 comprises a multitude of components in order to provide a radio communication link to other electronic devices based on each of the cellular wireless communication protocols. For example, the cell tower 102 may comprise radio heads, routers, antennas, electrical power sources, radio frequency power amplifiers, environment monitors, or other components. Some equipment at the cell tower 102 may support more than one protocol while other equipment (e.g., an eNB) may be limited to a particular protocol. All of the equipment that make up the cell tower 102 are not managed using the same inventory and fault systems and are not integrated, which makes fault monitoring on a component level difficult. In an embodiment, the cell tower 102 is located at the cell site 104. While FIG. 1 merely illustrates one cell tower 102 at one cell site 104, the component aware maintenance alarm monitoring system 100 may comprise a plurality of cell towers at a plurality of cell sites without departing from the spirit or scope of the present disclosure.

During operation, any component at the cell tower 102 may experience a fault, which may trigger an alarm. The alarm may be generated by an element management system (EMS). The alarms generated at the cell tower 102 may be monitored by one or more workstations 106 and/or the monitoring server 108. In some embodiments, the one or more workstations 106 and the monitoring server 108 may be referred to as a network operations center (NOC). The one or more workstations 106 and the monitoring server 108 may each be implemented as computer systems. Computer systems are described further hereinafter.

The monitoring server 108 may store and execute the monitoring application 110. In an embodiment, the monitoring application 110 receives one or more alarms generated by the cell tower 102 during a maintenance period. The alarm may be generated by the EMS and transmitted to the monitoring server 108. The maintenance period may be associated with maintenance of at least one component at the cell site 104. In an embodiment, the monitoring application 110 evaluates the one or more alarms based on accessing component alarm information associated with the one or more alarms from the alarm database 112, component inventory information associated with the component receiving maintenance or any other components associated with the one or more alarms from the integrated inventory database 114, and maintenance information associated with the cell site 104 from the maintenance activity database 116.

In an embodiment, the alarm database 112 comprises alarm information about alarms generated at the cell site 104. The alarm information may comprise information such as which component triggered the alarm, a time stamp associated with the alarm, or other alarm information. In an embodiment, the integrated inventory database 114 comprises component inventory information about components at the cell site 104. The component inventory information comprises dependency relationships among components at the cell site 104. In an embodiment, the dependence relationships are determined based on one or more of functional relationships between the components at the cell site 104, physical proximity of the components at the cell site 104, physical couplings of the components at the cell site 104, wireless communication protocol supported by the components at the cell site 104, or another dependency between the components at the cell site 104. The maintenance activity database 116 may comprise maintenance information about maintenance activities occurring at the cell site 104. In an embodiment, the maintenance information comprises type of maintenance activity occurring, procedure being performed and by which technician, start time for the maintenance activity, length of the maintenance activity, or other maintenance related information. The data in each of the databases 112, 114, and 116 may be refreshed periodically (e.g., daily) by reading from cell sites (e.g., from an EMS) to make sure the data is current and accurate. While it is contemplated here that the data in each of the databases 112, 114, and 116 may be refreshed daily, the databases may also be refreshed every second, every minute, every hour, every week, or some other period of time.

In some embodiments, some of the maintenance information in the maintenance activity database 116 is user inputted into the maintenance tool 118 via the scheduler 120. The scheduler 120 may be used to schedule maintenance activities at the cell site 104. While FIG. 1 illustrates three separate databases 112, 114, and 116, the data in those databases may be stored together or separate in more or less databases without departing from the spirit or scope of the present disclosure.

The evaluation of the one or more alarms may comprise the monitoring application 110 correlating the component inventory information from the integrated inventory database 114 with the alarm information from the alarm database 112 and the maintenance information from the maintenance database 116 to enable identification of which alarms received during the maintenance period should be addressed during the maintenance period and which alarms can be suppressed. For example, if maintenance is being performed on a router at the cell site 104 and another component at the cell site 104 generates an alarm, the monitoring application 110 utilizing the component inventory information may determine that the maintenance on the router is likely the cause of the alarm generated by the other component because of the dependency relationship between the two components (e.g., they share a common power source, etc.). In such a case, the monitoring application may selectively suppress that alarm.

In another example, if maintenance is being performed on a router at the cell site 104 and another component at the cell site 104 generates an alarm, the monitoring application 110 utilizing the component inventory information may determine that the maintenance on the router may be the cause of the alarm generated by the other component because of the dependency relationship between the two components (e.g., they are physically located near each other, etc.). In such a case, the monitoring application may transmit a notification to a technician at the cell site 104 during the maintenance period to allow the technician to further investigate the alarm. Utilization of component inventory information in correlation with alarm information and maintenance information is in contrast to traditional maintenance monitoring systems, which merely correlate alarm information and maintenance information.

In an embodiment, during the maintenance period, the monitoring application 110 takes an action based on the evaluation of the one or more alarms. For example, one potential action taken by the monitoring application 110 during the maintenance period comprises selectively suppressing some of the one or more alarms from the cell site 104 based on the evaluation of the one or more alarms. In an embodiment, the monitoring application 110 selectively suppresses less than all of the received alarms based on the evaluation of the received alarms. Said in other words, some alarms are selectively passed and other alarms are selectively suppressed. The selective suppression of less than all of the received alarms performed by the monitoring application 110 is in contrast to traditional maintenance alarm suppression systems, which provide a blanket suppression of all alarms during a maintenance period.

Another potential action taken by the monitoring application 110 during the maintenance period comprises transmitting a notification to a technician at the cell site 104 based on the evaluation of the one or more alarms. The technician that receives the notification may be a technician already at the cell site 104 performing maintenance on a component or a different technician at the cell site 104. The notification may comprise a component at the cell site 104 associated with the received alarm to enable the technician to investigate the component and hopefully correct whatever caused the alarm to be triggered in the first place. The monitoring application 110 transmitting the notification to a technician at the cell site 104 during the maintenance period is in contrast to traditional maintenance alarm suppression systems, which merely suppresses all alarms, even for unrelated components, throughout the maintenance period and/or clear the alarms once the maintenance period has expired.

The selective suppression of alarms received during a maintenance period and/or the transmission of a notification to a technician at the cell site 104 during the maintenance period based on the evaluation of the alarms may reduce cell site downtime by allowing a component associated with a received alarm to be addressed during the maintenance period, and thereby increase customer satisfaction. Additionally, the selective suppression of alarms received during a maintenance period and/or the transmission of a notification to a technician at the cell site 104 during the maintenance period based on the evaluation of the alarms received during the maintenance period may reduce maintenance costs by allowing a technician already present at the cell site 104 performing maintenance to address the component associated with the received alarm.

Another potential action taken by the monitoring application 110 during the maintenance period comprises prioritizing one of the received alarms based on the evaluation of the one or more alarms. Such an alarm may or may not have been suppressed before prioritization. The monitoring application 110 prioritizing an alarm during the maintenance period is in contrast to traditional maintenance alarm suppression systems, which merely clear alarms once the maintenance period has expired. In some embodiments, the monitoring application 110 re-evaluates the prioritized alarm after the maintenance period expires.

The network 122 comprises one or more private networks, one or more public networks, or a combination thereof. The network 122 promotes communication as desired among the several components 102, 106, 108, 110, 112, 114, 116, 118, and/or 120.

Figure 2:
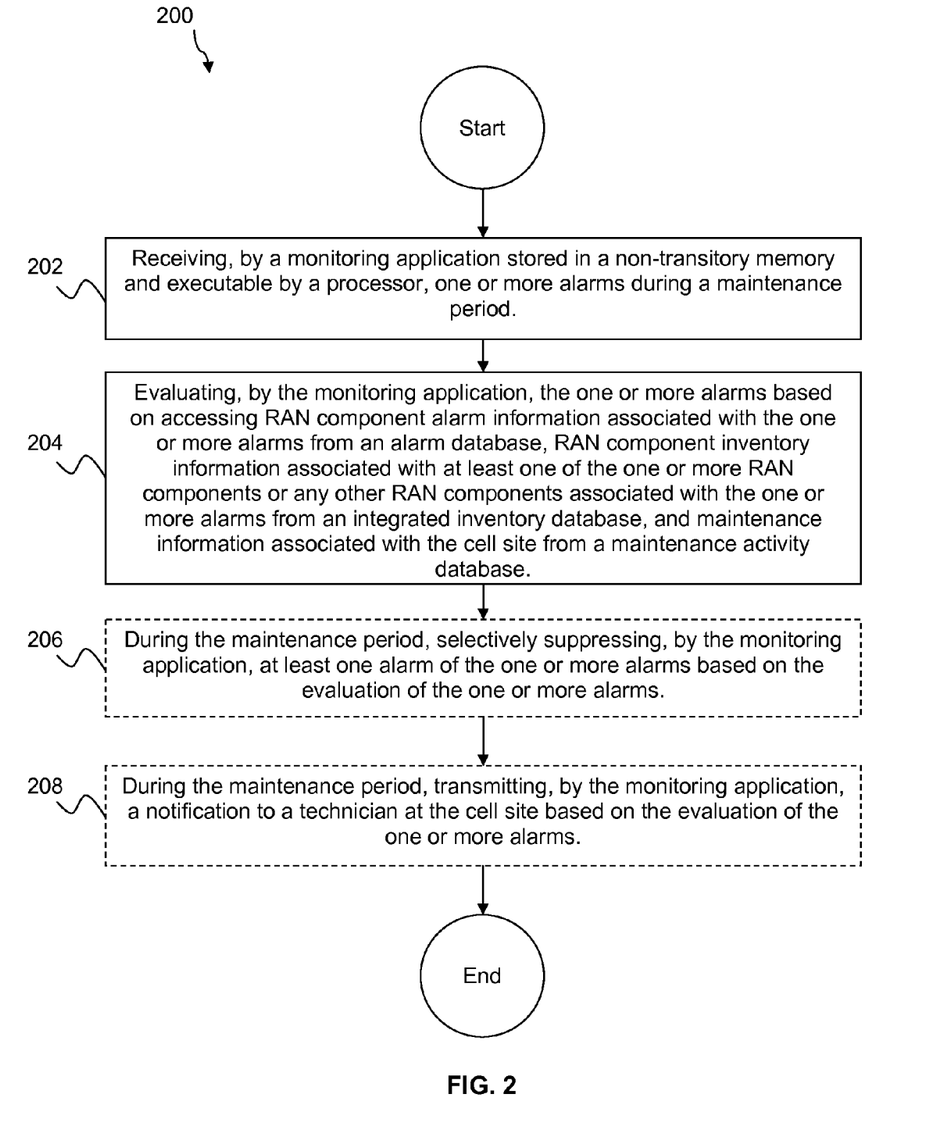
FIG. 2 is a flow chart of a method according to an embodiment of the disclosure.

Now turning to FIG. 2, a component aware maintenance alarm monitoring method 200 is described. At block 202, the monitoring application 110 receives one or more alarms during a maintenance period. The maintenance period may be associated with maintenance of at least one component at the cell site 104. At block 204, the monitoring application 110 evaluates the one or more alarms based on accessing alarm information associated with the one or more alarms from the alarm database 112, component inventory information associated with at least one of the one or more components or any other components associated with the one or more alarms from the integrated inventory database 114, and maintenance information associated with the cell site 104 from the maintenance activity database 116.

At block 206, the monitoring application 110 may selectively suppress at least one alarm of the one or more alarms during the maintenance period based on the evaluation of the one or more alarms. At block 208, the monitoring application 110 may transmit a notification to a technician at the cell site 104 during the maintenance period based on the evaluation of the one or more alarms. The notification may identify one or more components at the cell site 104 that are associated with at least one alarm of the one or more alarms. Although the selective suppression is illustrated in FIG. 2 as preceding the transmission of the notification, if the monitoring application 110 performs both a selective suppression of at least one alarm and a transmission of a notification to a technician at the cell site 104 that identifies a component associated with an alarm, in some embodiments, the transmission of the notification to the technician may occur before any alarms are selectively suppressed.

Figure 3:
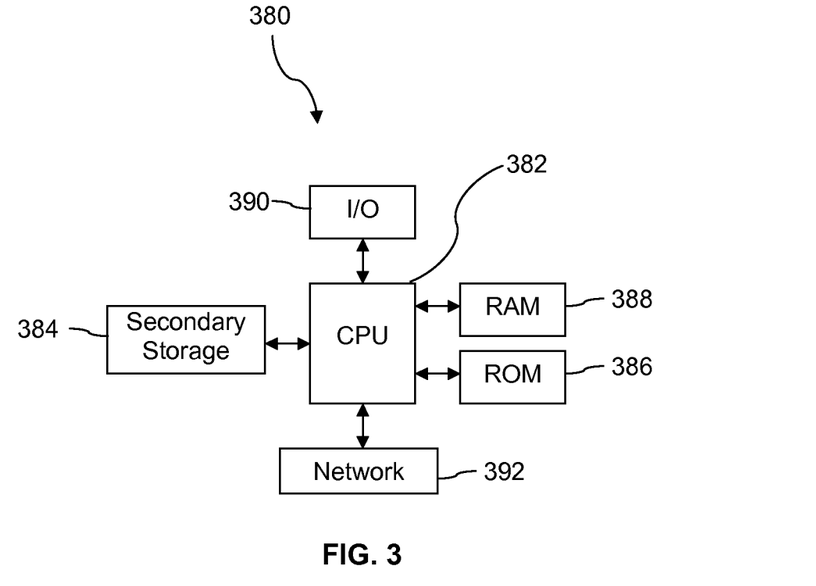
FIG. 3 illustrates an exemplary computer system suitable for implementing the several embodiments of the disclosure.

FIG. 3 illustrates a computer system 380 suitable for implementing one or more embodiments disclosed herein. For example, the computer system 380 may be used to implement any of the network components and/or elements, including a server. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementations in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer, which is a non-generic, particular machine and/or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, routers, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes, and is configured by, instructions, codes, computer programs, scripts which it accesses from hard disk, optical disk (these various disk based systems may all be considered secondary storage 384), flash drive, ROM 386, RAM 388, or the network connectivity devices 392. While only one processor 382 is shown, it is understood that any number of processors may be present and each processor may include one or more cores. Thus, while instructions may be discussed as executed by a processor, the instructions may be executed simultaneously, serially, or otherwise executed by one or multiple processors and/or cores therein through the use of threads. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software (e.g., a hypervisor) may be employed by the computer system 380 to provide the functionality of a number of servers that is not directly bound to the number of physical computers in the computer system 380. For example, virtualization software may provide twenty virtual servers on four physical host computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided via a computer program product that configures particular machines. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A component aware maintenance alarm monitoring system for one or more cellular sites, comprising:
    an alarm database that comprises radio access network (RAN) component alarm information;
    an integrated inventory database that comprises RAN component inventory information;
    a maintenance activity database that comprises maintenance information regarding maintenance performed at the one or more cellular sites; and
    a monitoring server comprising a monitoring application stored in a non-transitory memory of the monitoring server, that when executed by a processor of the monitoring server:
        receives a plurality of alarms during a maintenance period, wherein the maintenance period is associated with maintenance of one or more RAN components at a cellular site,
        evaluates the plurality of alarms based on accessing the RAN component alarm information associated with the plurality of alarms from the alarm database, the RAN component inventory information associated with at least one of the one or more RAN components or any other RAN components associated with the plurality of alarms from the integrated inventory database, and the maintenance information associated with the cellular site from the maintenance activity database, during the maintenance period, selectively suppresses a subset of the plurality of alarms and takes a different action on at least one alarm of the plurality of alarms not included in the subset based on the evaluation of the plurality of alarms, wherein the different action comprises prioritizing the at least one alarm, and re-evaluates the at least one alarm based on the prioritization after the maintenance period expires.

2. The system of claim 1, wherein the different action comprises transmitting a notification to a technician at the cellular site, and wherein the notification identifies a RAN component at the cellular site associated with the at least one alarm.

3. The system of claim 1, wherein the RAN component inventory information comprises dependency relationships among RAN components at the cellular site, and wherein the dependency relationships are determined based on one or more of functional relationships between the RAN components, physical proximity of the RAN components, or physical couplings of the RAN components.

4. The system of claim 1, wherein the plurality of RAN components comprise one or more of routers, radio heads, antennas, or electrical power sources.

5. The system of claim 1, further comprising a maintenance tool that includes a scheduler for scheduling maintenance activities at the cellular site, wherein the maintenance tool is communicatively coupled to the maintenance database, and wherein the maintenance database comprises a procedure implemented to the at least one RAN component by a technician during the maintenance period.

6. A component aware maintenance alarm monitoring method for one or more cellular sites, comprising:
   receiving, by a monitoring application stored in a non-transitory memory and executable by a processor, one or more alarms during a maintenance period, wherein the maintenance period is associated with maintenance of one or more radio access network (RAN) components at a cellular site;
   evaluating, by the monitoring application, the one or more alarms based on accessing RAN component alarm information associated with the one or more alarms from an alarm database, RAN component inventory information associated with at least one of the one or more RAN components or any other RAN components associated with the one or more alarms from an integrated inventory database, and maintenance information associated with the cellular site from a maintenance activity database;
   during the maintenance period, selectively suppressing, by the monitoring application, at least one alarm of the one or more alarms based on the evaluation of the one or more alarms;
   prioritizing, by the monitoring application, the suppressed at least one alarm; and
   re-evaluating, by the monitoring application, the suppressed at least one alarm based on the prioritization after the maintenance period expires.

7. The method of claim 6, wherein the monitoring application selectively suppresses less than all of the one or more alarms during the maintenance period based on the evaluation of the one or more alarms.

8. The method of claim 6, further comprising transmitting, by the monitoring application, a notification to a technician at the cellular site during the maintenance period, wherein the notification identifies at least one RAN component at the cellular site associated with a non-suppressed alarm of the one or more alarms based on the evaluation of the one or more alarms.

9. The method of claim 6, wherein the RAN component inventory information stored in the integrated inventory database comprises dependency relationships among RAN components at the cellular site.

10. The method of claim 9, wherein the dependency relationships are determined based on one or more of functional relationships between the RAN components, physical proximity of the RAN components, or physical couplings of the RAN components.

11. A component aware maintenance alarm monitoring method, comprising:
   receiving, by a monitoring application stored in a non-transitory memory and executable by a processor, one or more alarms during a maintenance period, wherein the maintenance period is associated with maintenance of one or more radio access network (RAN) components at a cellular site;
   evaluating, by the monitoring application, the one or more alarms based on accessing RAN component alarm information associated with the one or more alarms from an alarm database, RAN component inventory information associated with at least one of the one or more RAN components or any other RAN components associated with the one or more alarms from an integrated inventory database, and maintenance information associated with the cellular site from a maintenance activity database;
   during the maintenance period, transmitting, by the monitoring application, a notification to a technician at the cellular site based on the evaluation of the one or more alarms, wherein the notification identifies at least one RAN component at the cellular site that is associated with at least one alarm of the one or more alarms;
   selectively suppressing, by the monitoring application, less than all of the one or more alarms based on the evaluation of the one or more alarms;
   prioritizing, by the monitoring application, a non-suppressed alarm of the one or more alarms; and
   re-evaluating, by the monitoring application, the non-suppressed alarm based on the prioritization after the maintenance period expires.

12. The method of claim 11, wherein the at least one RAN component comprises one or more of routers, radio heads, antennas, or electrical power sources.

13. The method of claim 11, further comprising scheduling, by a scheduler of a maintenance tool, a procedure to be implemented to the at least one RAN component by the technician.

14. The method of claim 13, wherein the procedure is stored in the maintenance database.

* * * * *